F. F. WEAVER.
WEED CUTTER.
APPLICATION FILED MAY 18, 1918.
1,288,321.
Patented Dec. 17, 1918.
3 SHEETS—SHEET 2.
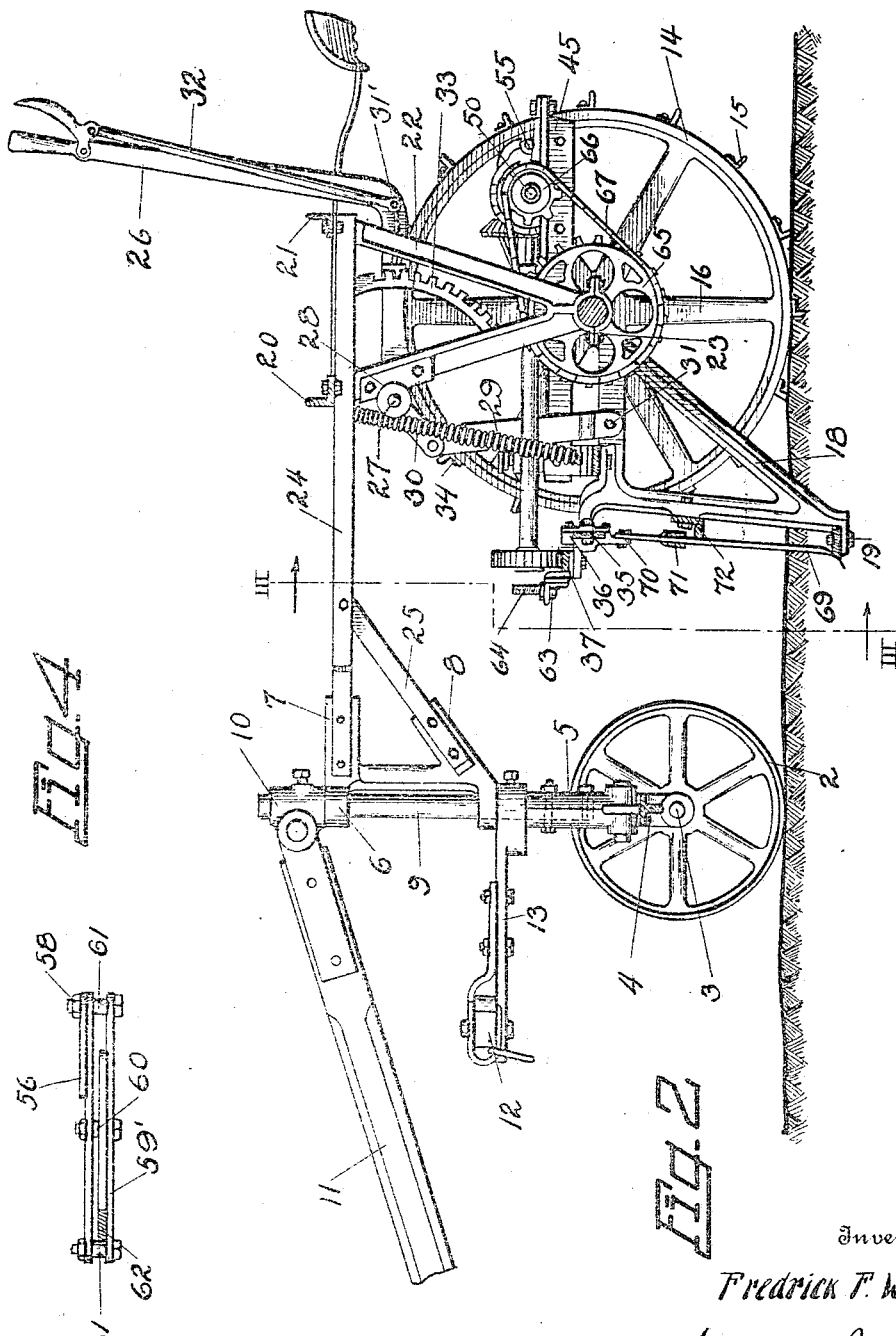
Inventor
Fredrick F. Weaver
Herbert E. Smith
Attorney F. F. WEAVER.
WEED CUTTER.
APPLICATION FILED MAY 18, 1918.
1,288,321.
Patented Dec. 17, 1918.
3 SHEETS—SHEET 3.
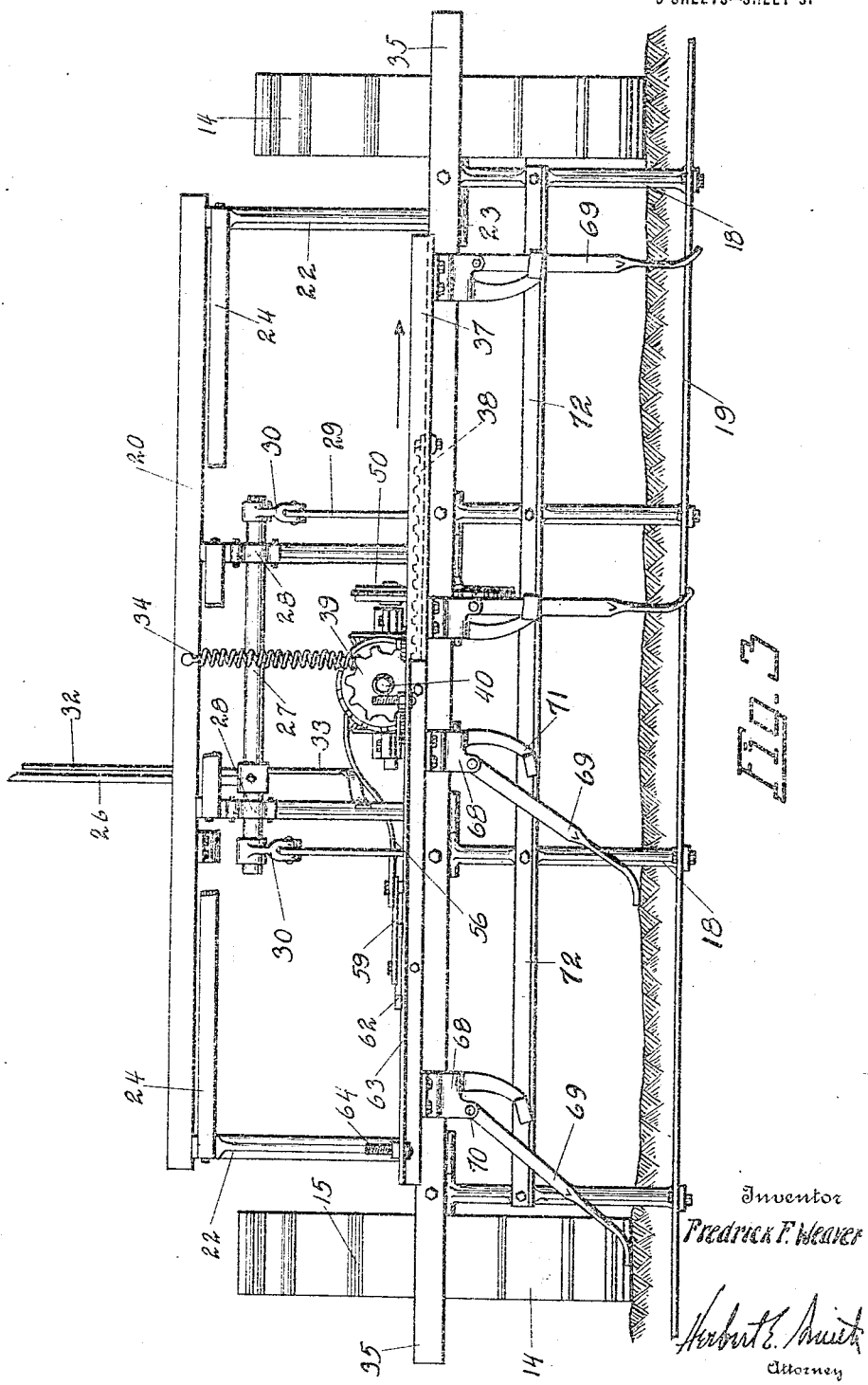
Inventor
Fredrick F. Weaver
Herbert E. Smith
Attorney

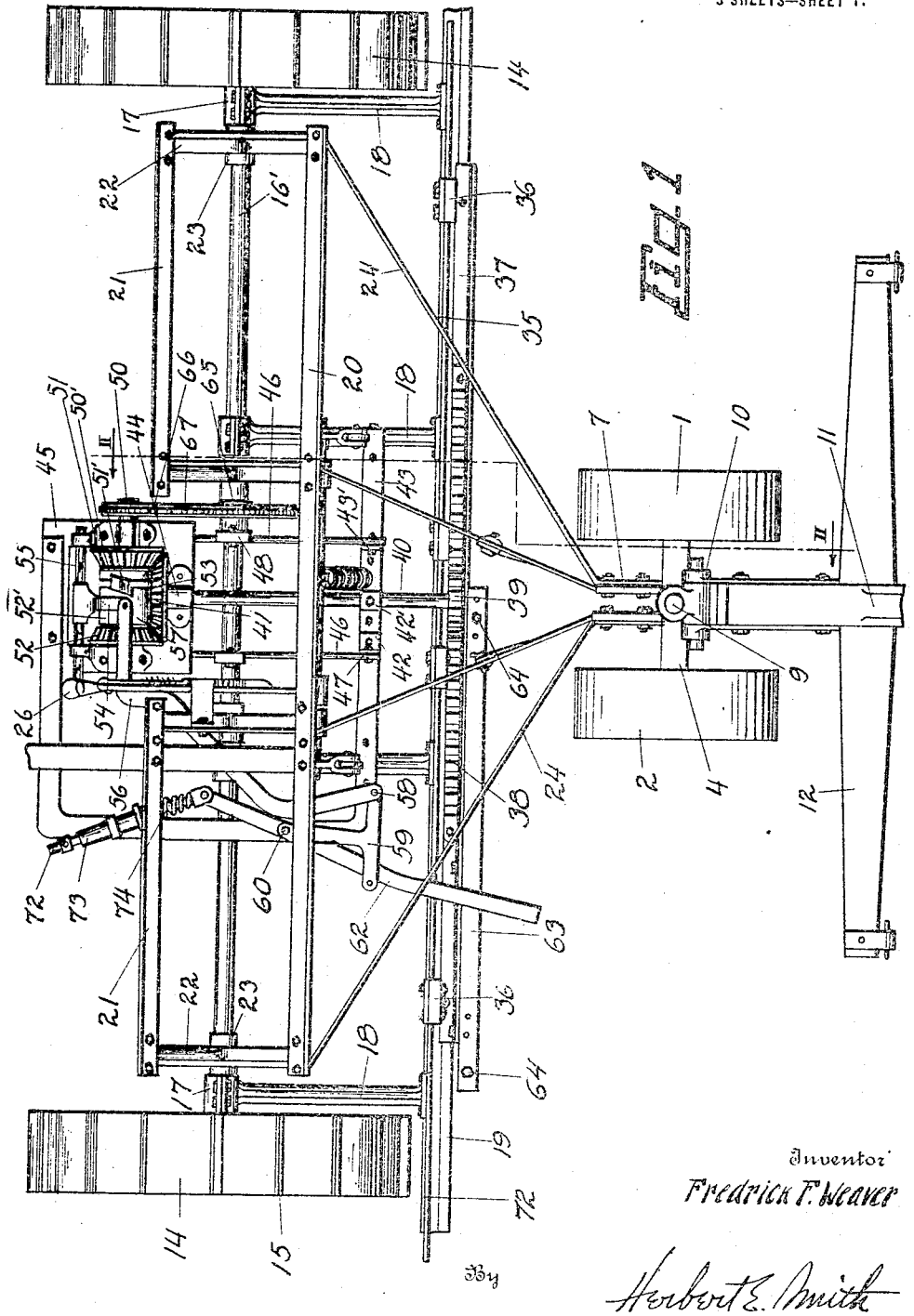

UNITED STATES PATENT OFFICE.

FREDRICK F. WEAVER, OF CHENEY, WASHINGTON.

WEED-CUTTER.

1,288,321.    Specification of Letters Patent.    Patented Dec. 17, 1918.

Application filed May 18, 1918. Serial No. 235,353.

*To all whom it may concern:*

Be it known that I, FREDRICK F. WEAVER, a citizen of the United States, residing at Cheney, in the county of Spokane, and State of Washington, have invented certain new and useful Improvements in Weed-Cutters, of which the following is a specification.

My invention relates to improvements in weed cutting machines, and one object thereof resides in providing an efficient machine of this character possessing novel details of construction, arrangement and combination of its several elements.

A more specific and most important object is the provision of automatically operated devices for cleaning the weed cutting knife of clinging earth and roots during the operation of the machine so as to maintain the same in the most efficient condition. In connection with said cleaning devices I have provided a greatly improved automatic reciprocating mechanism for their actuation.

The numerous features and advantages of my invention will be hereinafter clearly pointed out and described in detail, recourse being had to the accompanying drawings, in which—

Figure 1 is a top plan view of the complete apparatus.

Fig. 2 is a sectional side elevation of the machine, the view being taken on line 2—2 of Fig. 1.

Fig. 3 is a front sectional elevation taken on line 3—3 of Fig. 2 showing the rear or main portion of the organization.

Fig. 4 is a detail view to better illustrate the arrangement of a section of the automatic clutch actuating mechanism.

Referring specifically to the drawings like reference characters are used to indicate like parts throughout the specification.

The complete apparatus includes a forwardly disposed stabilizing pony truck which may be of any suitable design. The preferred construction as illustrated consists of the ground wheels 1 and 2 spaced somewhat apart as shown and mounted upon the axle 3 which supports a T-shaped crosspiece 4 having fixedly mounted thereon an upright standard receiving socket member 5 which also includes the standard receiving eye 6. Formed integral with 5 and 6 are the rearwardly extending bracket members 7 and 8. An upright standard 9 is adapted to be removably and revolubly mounted in said socket and eye and the upper end thereof is adapted to support a detachable collar 10 to which is pivotally secured a tongue 11. A further draft arrangement is indicated as a swingletree 12 which is pivotally supported by the strap 13 detachably mounted upon the socket member 5.

The cutter organization is disposed rearwardly of the pony truck and is mounted upon and supported by the driving traction wheels 14 which are supplied with peripheral spurs 15. These wheels are mounted upon a revoluble axle 16 and, as is evident, may be spaced apart any desired distance to accommodate a weed cutting knife of a length to cut the required breadth of swath.

Upon the axle housing 16' are pivotally mounted at 17 four triangular shaped depending hangers or brackets 18, one adjacent to each wheel 14 and two disposed at intermediate points, while secured to the lower ends thereof and extending transversely of the machine in a weed cutting knife 19 having its cutting edge directed forwardly.

Also supported by the axle housing 16' is the rigid rectangular frame composed of a front bar 20 and two rear bars 21, said front and rear bars being mounted upon four upwardly extended V-shaped frame supports 22 which are secured to said axle housing 16' at points 23. Said frame is rigidly connected to the bracket members 7 and 8 of the pony truck by means of the bars 24 and brace-bars 25.

As before stated the knife supporting brackets or hangers 18 are pivotally mounted upon the axle housing 16' the purpose being to allow the knife to be raised or lowered so that the same may be disposed below the surface of the ground at any depth or adapted to skim the surface. To facilitate the depression and elevation of the knife I have provided a convenient adjusting device consisting of a manually operated lever 26 fixedly mounted upon a shaft 27 which is in turn revolubly mounted by means of bearings 28 on the two intermediate upwardly extended frame supports 23. Links 29 form connections between the forked ends of lever members 30 which are fixedly mounted on said shaft, and two of the depending brackets or hangers 18, at 31. The lever 26 is provided with a pawl 31' and an operating handle 32, said pawl being adapted to engage the toothed segment 33 whereby the knife may be locked in adjusted position. A coil spring 34 serves to counter-balance the weight of the knife and its supporting elements so that adjustment of the knife may be accomplished without great physical exertion.

To insure practical and efficient operation of machines of this character it is essential to at all times keep the weed cutting knife free of earth and other clinging substances or matter, and to this end I have provided the following described automatically actuated cleaning mechanism. Fixedly secured to and connecting the forward upper corners of the depending brackets or hangers 18 is a rail-bar 35 and mounted thereon by means of the grooved blocks 36 is a reciprocating rack-bar 37 which is adapted to travel back and forth along said rail bar.

In order to impart reciprocating motion to said rack-bar 37 the same is provided upon its upper face, intermediate of its ends, with the toothed rack 38 with which meshes a toothed gear 39 mounted upon one end of a revoluble shaft 40, said shaft carrying at its opposite end a bevel gear 41. The shaft is supported in a bearing 42' mounted upon a bridge-plate 42 which is supported by a stringer piece 43 having flanges 43', and in a bearing 44 upon the gear-frame or bed 45 which latter is supported by the parallel bars 46 secured at 47 to the flanges 43' and at 48 to the axle-housing 16'. The gear-frame 45 is further supported and rendered rigid by a rearwardly extending angle arm 49 of the stringer 43. The shaft 40 is adapted to be rotated alternately in opposite directions to move the rack-bar 37 back and forth along the rail-bar 35. To this end, in said gear-frame is also mounted a revoluble shaft 50 which is squared, keyed, or feathered as at 50' intermediate of its ends, and provided at either end with the rotatable and loosely mounted bevel gears 51 and 52 which mesh with bevel gear 41, said gears 51 and 52 being provided with recessed integral clutch members 51' and 52', respectively. A double clutch-collar 53 slides upon the shaft 50, said collar having the usual engaging recesses on either face as shown, adapted to engage the opposed clutch members 51' and 52', alternately.

The means for shifting the collar into alternate engagement with members 51' and 52' automatically, consists of a shifting finger 54 slidably mounted on a shaft 55, and an angularly shaped shifting-arm 56 which has its opposite ends pivotally mounted at 57 to finger 54, and at 58 to the frame 59 which is in turn pivotally mounted at 60 to the extension 49. Said frame 59 is of T-form and constructed of companion sections 59' spaced apart at their free extremities by bolts 61. An actuating lever 62 is mounted within the sections of the frame 59 and also pivotally mounted intermediate of its ends at the point 60.

An extended longitudinal flange 63, integral with rack-bar 37, carries near either end upstanding bolts or pins 64. Said pins are adapted to alternately engage the arm 62 as the bar 37 is propelled back and forth along the rail-bar 35 by reversal of the rotation of the gear 39 of the shaft 40 acting upon the rack 38.

In operation, when rack-bar 37 approaches the intended limit of a given endwise movement on the rail-bar 35 one of the pins 64 will engage the arm 62 to throw the latter until it engages one of the bolts 61 of the frame 59, and the continued subsequent movement of the rack-bar will then impart a shifting motion to the shifting-arm 56 whereby clutch collar 53 will be disengaged from one of the opposed clutch members 51' or 52' and shifted into operative engagement with the other clutch member. To prevent casual disengagement of the clutch collar 53 with either member 51' or 52', to one end of the arm 62 is attached a spring tension device comprising a pivotally mounted rod 72, a collar 73, and a compressed coil spring 74 which is designed to impart a thrust to the arm 62 after the same has been pivotally shifted by pins 64 past its center of movement with respect to the frame 59, such center of movement being approximately at the point of intersection of the arms of said frame. From the foregoing it will be apparent that the shaft 40 will be alternately and automatically rotated in opposite directions at predetermined intervals and a reciprocating movement consequently imparted to the rack-bar. Power to rotate the shaft 50 is transmitted by means of the sprocket 65 mounted on the axle 16, sprocket 66 on said shaft, and chain 67.

Depending from hangers 68 mounted upon the rack-bar 37 are the knife cleaners or scrapers 69 which are formed with curved or hooked and pointed lower ends as shown which ends are so disposed with relation to the knife 19 as to firmly engage the same as the rack-bar travels back and forth. These scrapers are pivotally mounted at 70 and when in active operative scraping relation to the knife are adapted to be engaged and held in substantially vertical position (see Fig. 33) by the depending stirrups 71. The scrapers are mounted to operate in opposite directions during movement of the rack-bar, as shown, for instance, in Fig. 3. During backward or reverse inoperative movement of the scrapers, which is the position occupied by the scrapers illustrated at the left of Fig. 3, the scrapers will be elevated and drag along the surface of the ground and thus eliminate to a considerable degree excessive friction and thereby also tend to cause the hooked ends to raise the roots and weeds to the surface during the movement. A bar 72 mounted upon the forward portions of the members 18 serve to reinforce and to guide the cleaners 69.

Having described my invention, I claim:—

1. A machine of the character described, comprising traction driving wheels and an axle therefor, depending members supported by the axle, a cutter carried by said depending members, a reciprocating bar carried by said depending members, cleaners carried by said bar adapted to engage said cutter, and means for imparting reciprocatory movement to said bar from said wheels, said means including a train of bevel gears, a slidable clutch adapted to alternately engage said bevel gears, a rack carried by said bar, a gear engaging said rack, an arm adapted to operate said clutch, and members carried by said reciprocating bar adapted to engage said arm.

2. A machine of the character described, comprising traction driving wheels and an axle therefor, depending members supported by the axle, a cutter carried by said depending members, a reciprocating bar carried by said depending members, cleaners carried by said bar adapted to engage said cutter, and means for imparting reciprocatory movement to said bar from said wheels, said means including a train of bevel gears, a slidable double clutch adapted to alternately engage two of said bevel gears, a rack carried by said bar, a gear engaging said rack, an arm adapted to operate said clutch, members carried by said reciprocating bar adapted to engage said arm, and a spring tension device adapted to exert tension on said arm to retain said clutch in operative engagement with said bevel gears.

3. A machine of the character described, comprising traction driving wheels and an axle therefor, depending members supported upon the axle, a cutter carried by said depending members, a reciprocating bar carried by said depending members, cleaners carried by said bar adapted to engage said cutter, and means for imparting reciprocatory movement to said bar from said wheels, said means including intermeshing bevel gears, a slidable double clutch, a rack carried by said bar, a gear engaging said rack, a lever adapted to slide said clutch, a pivotally mounted frame connected to said lever, engaging bolts carried by said frame, a pivotally mounted actuating arm coöperating with said frame and bolts, members carried by said reciprocating bar adapted to engage said actuating arm, and a device adapted to exert tension on said arm to retain said clutch in operative engagement with said bevel gears.

4. A machine of the character described, comprising traction driving wheels and an axle therefor, a frame rigidly supported by the axle, depending members pivotally supported by the axle, a cutter and a reciprocating bar carried by said depending members, cleaners carried by said bar adapted to engage said cutter, a rotatable shaft mounted upon said frame, a manually operated lever for rotating said shaft, a pivoted connection between said shaft and said pivoted depending members, a counterbalancing spring connecting said frame and said depending members, and means for imparting reciprocatory movement to said bar from said wheels.

In testimony whereof I affix my signature.

FREDRICK F. WEAVER.

Copies of this patent may be obtained for five cents each, by addressing the "Commissioner of Patents, Washington, D. C."